United States Patent [19]

Douklias et al.

[11] Patent Number: 4,642,129

[45] Date of Patent: Feb. 10, 1987

[54] METHOD FOR MANUFACTURING PREFORMS OF GLASS FOR OPTICAL FIBERS

[75] Inventors: Nikolaos Douklias, Kirchheim; Josef Grabmaier, Berg, both of Fed. Rep. of Germany

[73] Assignee: Siemens Aktiengesellschaft, Berlin and Munich, Fed. Rep. of Germany

[21] Appl. No.: 759,233

[22] Filed: Jul. 26, 1985

[30] Foreign Application Priority Data

Sep. 20, 1984 [DE] Fed. Rep. of Germany ....... 3434598

[51] Int. Cl.⁴ ............................................. C03B 37/025
[52] U.S. Cl. ....................... 65/3.12; 65/3.31; 65/18.2
[58] Field of Search ...................... 65/3.12, 18.1, 3.31, 65/18.2

[56] References Cited

U.S. PATENT DOCUMENTS

| | | | |
|---|---|---|---|
| 4,336,049 | 6/1982 | Takahashi et al. | 65/3.12 |
| 4,417,911 | 11/1983 | Cundy et al. | 65/3.12 |
| 4,453,961 | 6/1984 | Berkey | 65/3.12 |
| 4,568,370 | 2/1986 | Powers | 65/3.12 |

FOREIGN PATENT DOCUMENTS 1537617  7/1968  France ................................. 65/134

*Primary Examiner*—Arthur Kellogg
*Attorney, Agent, or Firm*—Hill, Van Santen, Steadman & Simpson

[57] ABSTRACT

An improved method of forming porous glass preforms by generating glass particles from a vapor phase and applying the particles onto a substrate characterized by generating the glass particles from a vapor phase in a separate operation, collecting the particles and then subsequently applying the previously collected particles onto a deposition surface of the substrate by creating a hot zone adjacent the deposition surface and projecting the particles as a stream through the hot zone and onto the deposition surface.

30 Claims, 3 Drawing Figures

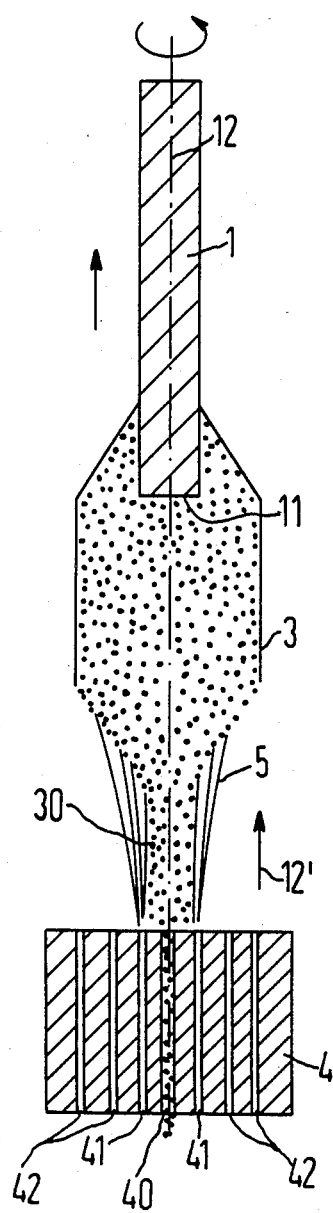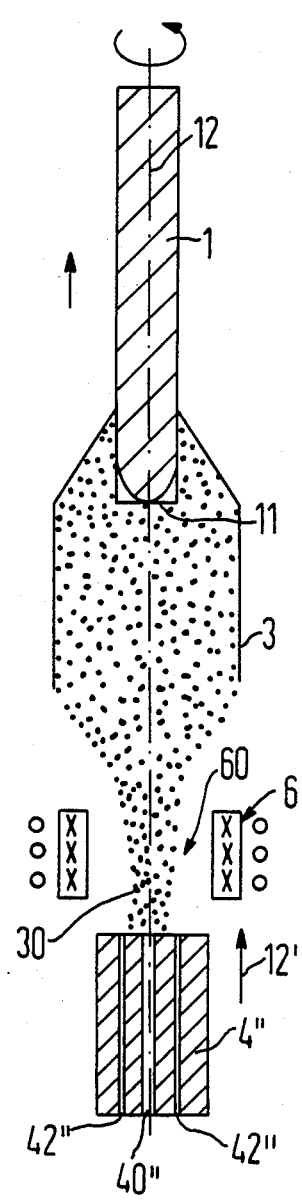

METHOD FOR MANUFACTURING PREFORMS OF GLASS FOR OPTICAL FIBERS

BACKGROUND OF THE INVENTION

The present invention is directed to a method for manufacturing preforms of glass which are subsequently drawn into optical fibers particularly for use in optical communications technology. The method includes generating glass particles from a vapor phase, collecting the glass particles and then subsequently applying the glass particles to a substrate to form a porous preform member which is subsequently utilized in forming optical fibers.

It has been previously known to form preforms of glass for subsequent drawing into optical fibers by generating glass particles from a vapor phase and applying these particles directly onto a substrate. These known methods of forming or depositing glass particles from a vapor phase are broken into four different species. These species principally are as follows:

(a) an OVD method wherein glass particles are directly deposited from a vapor phase onto a generated surface of an auxiliary rod;

(b) a MCVD method wherein the glass particles are directly deposited from a vapor phase onto the inside wall of a silica glass tube with the assistance of a burner;

(c) a PVCD method wherein the glass particles are directly deposited from a vapor phase onto the inside wall of a silica glass tube with the assistance of a plasma; and (d) a VAD method wherein the glass particles are directly deposited from the vapor phase onto an end of a rod.

In all of the four methods, vaporous $SiCl_4$, $GeCl_4$, $TiCl_4$, $BCl_3$, $BBr_3$, $CCl_2$, $F_2$ and $POCl_3$ are converted into oxides in a hot or, respectively, plasma zone and these oxides are deposited in soot form onto the relatively cold surface of the substrate immediately thereafter. In a later step, the deposited soot is fused to clear glass or, respectively, is sintered clear. At the end, a rod-like preform is obtained from which the optical fiber can be subsequently drawn.

A common problem in all of the above-mentioned methods is that the production rate is still relatively low due to the low deposition rate. Moreover, a large part of the vapor-like and particle-like reaction gases are lost as exhaust gas and a large part of the product is also lost as waste.

SUMMARY OF THE INVENTION

The present invention is directed to an improved method that is more efficient than the above-mentioned methods of depositing glass from a vapor phase.

To achieve this object, the present invention is directed to a method for manufacturing preforms of glass for subsequent making optical fibers, particularly for optical communication fibers, comprising the steps of generating glass particles from a vapor phase, collecting the glass particles produced from the step of generating the glass particles and then subsequently applying the collected glass particles to a substrate for the formation of a porous member forming a preform for the production of optical fibers.

The performance of the steps or operation of generating the glass particles from the vapor phase and applying the generated glass particles onto the substrate as separate and distinct operations enables the possibility of producing the glass particles on a large industrial scale with a relatively extreme high deposition rate and an extremely high quality. Thus, an extremely efficient production of the preforms for optical fibers can occur.

Other advantages and embodiments of the inventive method will be readily apparent from the following specification, claims and drawings.

BRIEF DESCRIPTION OF THE DRAWINGS

FIG. 1 is a schematic cross-sectional view of an apparatus for forming a porous member by spraying glass particles in a flame of a gas burner in a direction of an end face of a substrate rod which is being rotated around its longitudinal axis and is being moved along its axis away from the gas burner;

FIG. 2 is a schematic cross-sectional view of an apparatus for the formation of a porous member by spraying glass particles from a nozzle through an induction or plasma furnace and onto an end face of a substrate rod rotating around its longitudinal axis and moving along its axis away from the nozzle.

DESCRIPTION OF THE PREFERRED EMBODIMENTS

Figure 3:
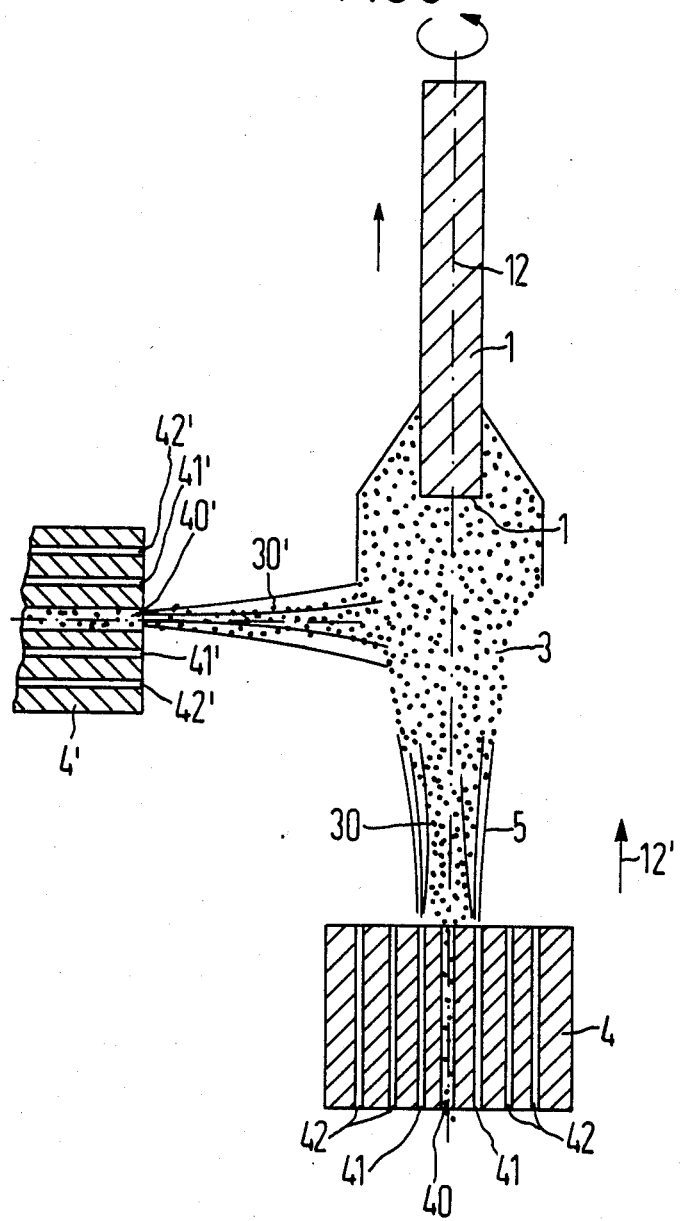
FIG. 3 is a schematic cross-sectional view of an apparatus for forming a porous member by spraying glass particles from a nozzle in the direction of the end face of a substrate rod which is rotating around its longitudinal axis and moving away from the nozzle and by spraying glass particles on a generated surface of the member which is being formed from a direction substantially perpendicular to the longitudinal axis of the substrate rod.

For an extremely economical manufacture of a preform, $SiO_2$ particles (aerosol) having a grain size in the range of 0.01–0.05 $\mu$m are produced. A porous cylindrical member is produced with this material by spraying the heated particles onto a substrate which is likewise heated. The above-mentioned process can be expediently implemented in accordance with the three separate devices illustrated in FIGS. 1–3. For example, in each of the devices of the Figure, glass particles 30 are sprayed in a defined direction 12' toward and onto a facing end face 11 of a rod 1 which is rotated around its longitudinal axis 12. A porous-formed member 3, which is composed of glass particles 30, grows in a direction that is opposite to the defined direction 12'. As illustrated, the rod 1 is mounted above the spray of particles and the axis 12 lies in a vertical direction.

In the apparatus illustrated in FIG. 1, the glass particles 30 are sprayed onto the rod 1 through a spray nozzle 40 of a gas burner 4 while a flame 5 is emitted from the burner and is directed in an axial direction onto the rod 1. The flame forms a hot zone for heating the sprayed glass particles 30 and the deposition surface to the desired temperature. What is meant by deposition surface is the surface region of the substrate or of the formed member 3 growing thereon on which the sprayed glass particles are deposited.

The burner 4, as illustrated, has only one nozzle 40 for spraying the glass particles 30. This spray nozzle 40 is surrounded by nozzles 41 which are supplied with a combustion gas or a combustion gas mixture, for example, oxyhydrogen gas, methane, propane and/or carbon monoxide, particularly the oxyhydrogen gas. Thus, a flame 5 projects from these nozzles 41. A plurality of annularly disposed nozzles 41 and 42 for the particle feed can also be provided. The nozzles 41 and 42 can also serve for supplying a controlled or protective atmosphere.

In the arrangement of FIG. 2, a spray apparatus 4" has a nozzle 40" through which the flow of glass particles 30 are sprayed together with a controlled or protective atmosphere which is supplied through nozzles 42" under given conditions. The flow of particles 30 and the gas or protective atmosphere pass through an induction or plasma furnace 6 which generates a hot zone 60 for heating the sprayed glass particles 30 and the deposition surface. The sprayed apparatus 4" can be formed by the nozzle arrangement of the burner 4 of FIG. 1; however, it is not operated as a burner.

In the apparatus device of FIG. 3, not only are glass particles 30 sprayed in a longitudinal or axial direction of the rod 1 but glass particles 30' are also sprayed onto a generated surface of the formed member 3 which is growing in a longitudinal direction. The particles 30' are sprayed from a direction which is substantially perpendicular or at an angle to the longitudinal axis of the rod 1. This can be undertaken with a pair of burners 4 and 4' with the burner 4' being substantially the same as the burner 4 of FIG. 1. The burner 4' has the spray nozzle 40 and nozzles 41 and 42. As illustrated, the burner 4' is positioned with the nozzles 40', 41' and 42' extending perpendicularly or at an angle to the longitudinal axis 12 of the rod 1 but otherwise they are basically the same as the nozzles 40, 41 and 42 of the burner 4. Each of the burners 4 and 4' could be replaced by a spray device 4" with a correspondingly disposed induction or plasma furnace 6 as illustrated in FIG. 2.

Refractive index profiles are expediently produced in the formed member 3 by spraying particles 30 which include glass-forming substances which will also modify the refractive index of the $SiO_2$. Thus, in the manufacture of the porous member 3, glass particles together with the glass-forming substances which also modify the refractive index of the glass are expediently sprayed simultaneously from various spray nozzles whereby different mixing ratios can be selected. This can be undertaken with a plurality of spray nozzles proceeding longitudinally axially relative to the rotating rod, for example, with a plurality of spray nozzles according to the device of FIGS. 1–3.

Specifically, glass particles together with the substance increasing the refractive index are sprayed from the spray nozzles disposed on the longitudinal axis of the rotating rod 1 and the glass particles together with a substance which will lower the refractive index are sprayed from the spray nozzles such as 4' which are disposed perpendicular or at an angle to the longitudinal axis 12 of the rod 1. For example, the flow of particles 30 includes both $SiO_2$ particles as well as $GeO_3$ particles and are sprayed from the nozzles 40. $SiO_2$ particles in combination with either $B_2O_3$, $TiO_2$ and/or $P_2O_5$ are sprayed from the spray nozzle such as 40'.

Subsequent to forming the member 3, the porous member 3 is expediently cleaned by chemical aftertreatment which is performed in a gas atmosphere selected from a group consisting of chlorine and helium. Expediently, a treatment of the manufactured porous form 3 is also done in a vacuum.

A porous form member 3 manufactured in the above fashion is preferably condensed by means of a viscous sintering over a period of 24 hours at a temperature in a range between 1100° and 1600° C. Preferably, the temperature is 1200° C. The condensing of the porous form member 3 can also be undertaken by means of hot-pressing.

As a result of turning the rod 1, the growing, porous member 3 is rotated around its axis. This is beneficial for the manufacture of the member 3. It is also expedient to move the rod 1 and thus the growing member 3 upward along the axis 12 of the rod 1 while the glass particles 30 are being sprayed and deposited on the deposition surface.

A simple way of favorably influencing the above-described method for manufacturing the porous form member 3 comprises employing glass particles 30 and 30' in a dispersion solution in order to be able to conduct them more easily through the hot zones 5 or 60. The liquid of the solution is thereby eliminated as steam and the glass particles 30 or 30' are used for the manufacture of the porous member 3.

Although various minor modifications may be suggested by those versed in the art, it should be understood that we wish to embody within the scope of the patent granted hereon, all such modifications as reasonably and properly come within the scope of our contribution to the art.

We claim:

1. A method for manufacturing preforms of glass for subsequently making optical fibers comprising the steps of generating glass particles from a vapor phase; collecting the glass particles produced from the step of generating the glass particles; and then subsequently applying the collected glass particles to the deposition surface of a substrate for the formation of a porous member to form a preform for the production of optical fibers by creating a stream of collected particles, by heating the stream of collected particles and by directing the heated stream onto the deposition surface.

2. A method according to claim 1, wherein the step of applying the collected glass particles includes heating the particles of the stream and the deposition surface to a predetermined temperature so that the particles will adhere on the deposition surface of the porous member being formed.

3. A method according to claim 2, wherein the step of heating includes forming a hot zone and projecting the stream of particles through the hot zone onto the deposition surface.

4. A method according to claim 3, wherein the step of creating a stream includes providing the particles in a dispersion solution.

5. A method according to claim 3, wherein the step of forming a hot zone comprises projecting a flame onto the deposition surface.

6. A method according to claim 3, wherein the step of forming a hot zone utilizes an induction or plasma furnace.

7. A method according to claim 3, wherein the step of applying the glass particles comprises applying glass particles together with at least one glass-forming substance to modify the refractive index of the glass.

8. A method according to claim 7, wherein the glass particles together with the glass-forming substance are sprayed simultaneously from various spray nozzles so that different mixing ratios can be selected.

9. A method according to claim 1, wherein the step of generating the glass particles generates the glass particles from a vapor phase with the particle size in the order of 0.1–0.15 μm.

10. A method according to claim 9, wherein the step of heating the stream of glass particles comprises forming a hot zone adjacent the deposition surface and passing the stream through the hot zone to heat the particles as the deposition surface is heated.

11. A method according to claim 1, wherein the step of directing the heated stream of glass particles comprises spraying the heated stream in a definite direction onto a deposition surface of the substrate with the porous member growing in a direction opposite said definite direction.

12. A method according to claim 11, wherein the substrate is a rod-shaped substrate and the step of spraying the stream in a definite direction sprays the stream in an axial direction of the rod-shaped substrate.

13. A method according to claim 12, wherein the step of applying the particles includes spraying a second stream of particles at a direction extending at an angle to the first-mentioned stream and onto a porous member formed by the first stream.

14. A method according to claim 13, wherein the step of creating the first stream forms a first stream of glass particles together with at least one substance increasing the refractive index and said step of spraying the second stream includes forming the second stream of glass particles with at least one substance lowering the refractive index of the glass.

15. A method according to claim 13, which includes rotating the rod-shaped substrate on its longitudinal axis during the applying of the glass particles.

16. A method according to claim 15, which includes moving the rod-shaped substrate on its axis as the glass particles of the first stream build up on the deposition surface thereof.

17. A method according to claim 12, which includes rotating the rod-shaped substrate on its longitudinal axis as the particles are being applied to an end thereof.

18. A method according to claim 17, which further includes moving the rod-shaped axis in a direction away from the first stream as the particles accumulate on the deposition surface.

19. A method according to claim 1, which includes subjecting the porous member to an after-treatment in a gas selected from a group consisting of chlorine and helium.

20. A method according to claim 1, which includes subjecting the porous member to an after-treatment in a vacuum.

21. A method according to claim 20, wherein the after-treatment comprises condensing the porous member by sintering.

22. A method according to claim 21, wherein the sintering is a viscous sintering conducted for about 24 hours at a temperature in a range between 1100° and 1600° C.

23. A method according to claim 22, wherein the sintering is undertaken at 1200° C.

24. A method according to claim 1, which includes condensing the porous member by hot-pressing.

25. A method of manufacturing preforms of glass for subsequently making optical fibers comprising the steps of generating glass particles from a vapor phase; collecting the glass particles produced from the step of generating the glass particles; and then subsequently applying the collected glass particles to a substrate for formation of a porous member to form a preform for the production of optical fibers by creating a hot zone adjacent a deposition surface of the substrate for heating the substrate and by projecting the collected particles in a stream through the hot zone and onto the deposition surface.

26. A method according to claim 25, wherein the substrate is a rod-shaped element, said step of applying includes rotating the rod-shaped element on its longitudinal axis and moving the rod-shaped element in a direction along its longitudinal axis, said step of projection sprays the particles in the direction of the axis of the rod onto a deposition face beginning at an end face of the rod and growing axially therefrom.

27. A method according to claim 26, wherein the step of creating the hot zone comprises projecting a gaseous combustion mixture from a burner in an axial direction of the substrate.

28. A method according to claim 26, wherein the step of creating a hot zone comprises providing a plasma furnace adjacent the deposition surface and projecting the particles through said furnace onto the deposition surface.

29. A method according to claim 26, which further includes creating a second hot zone and stream of particles extending in a direction transverse to the axial direction of the preform, to form a second deposit surface on the previously-formed porous member.

30. A method according to claim 1, wherein said step of creating a stream creates a stream having a mixture of glass particles and glass forming substances in a mixing ratio and said method includes changing the ratio to modify the index of refraction of the glass of the preform.

* * * * *